Oct. 18, 1938.  A. L. DILLER ET AL  2,133,346
METHOD OF APPLYING COATINGS TO PARTS OF RUBBER ARTICLES
Filed March 25, 1936  2 Sheets-Sheet 2
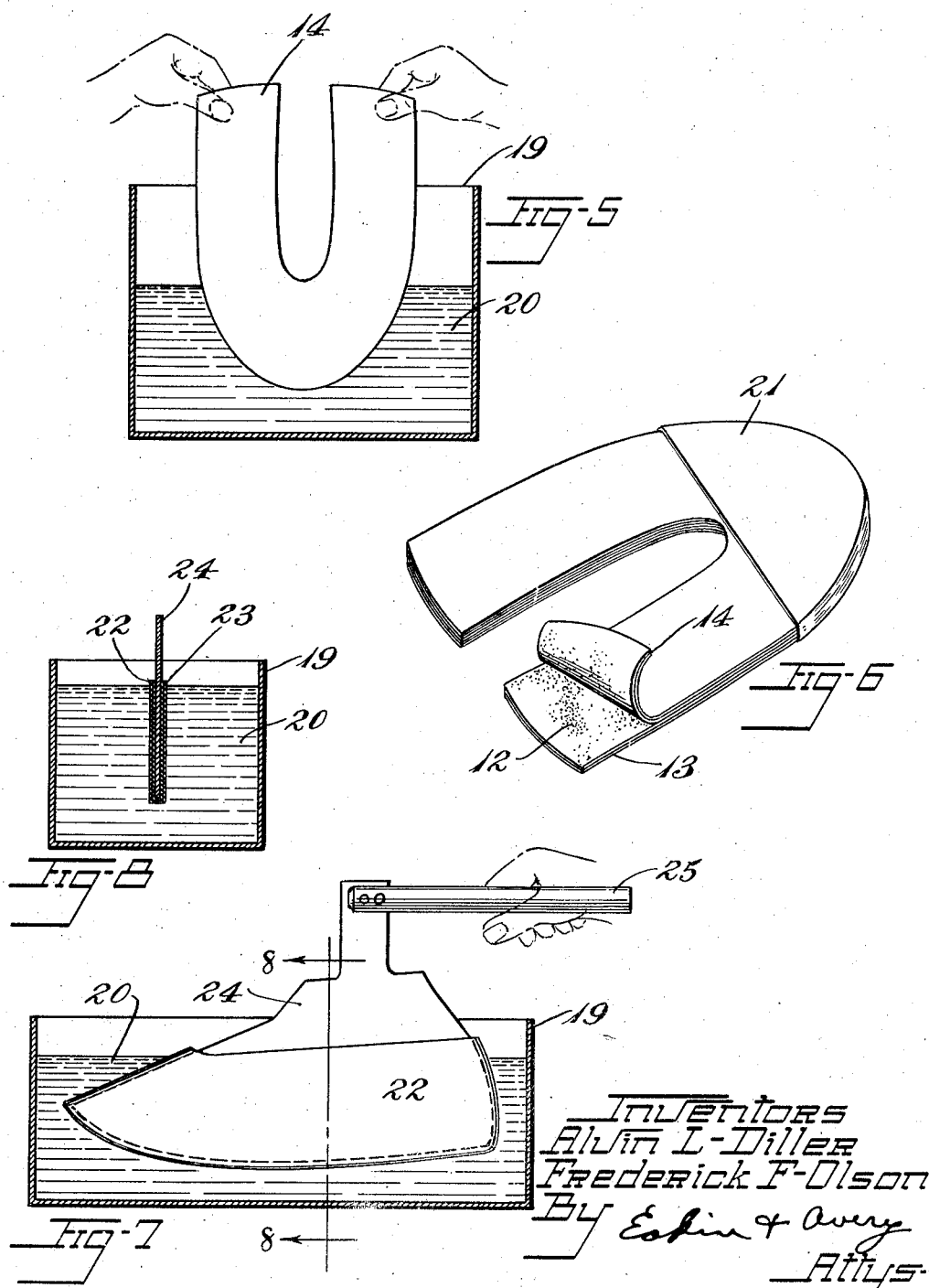
Inventors
Alvin L. Diller
Frederick F. Olson
By Eshin & Avery
Attys.

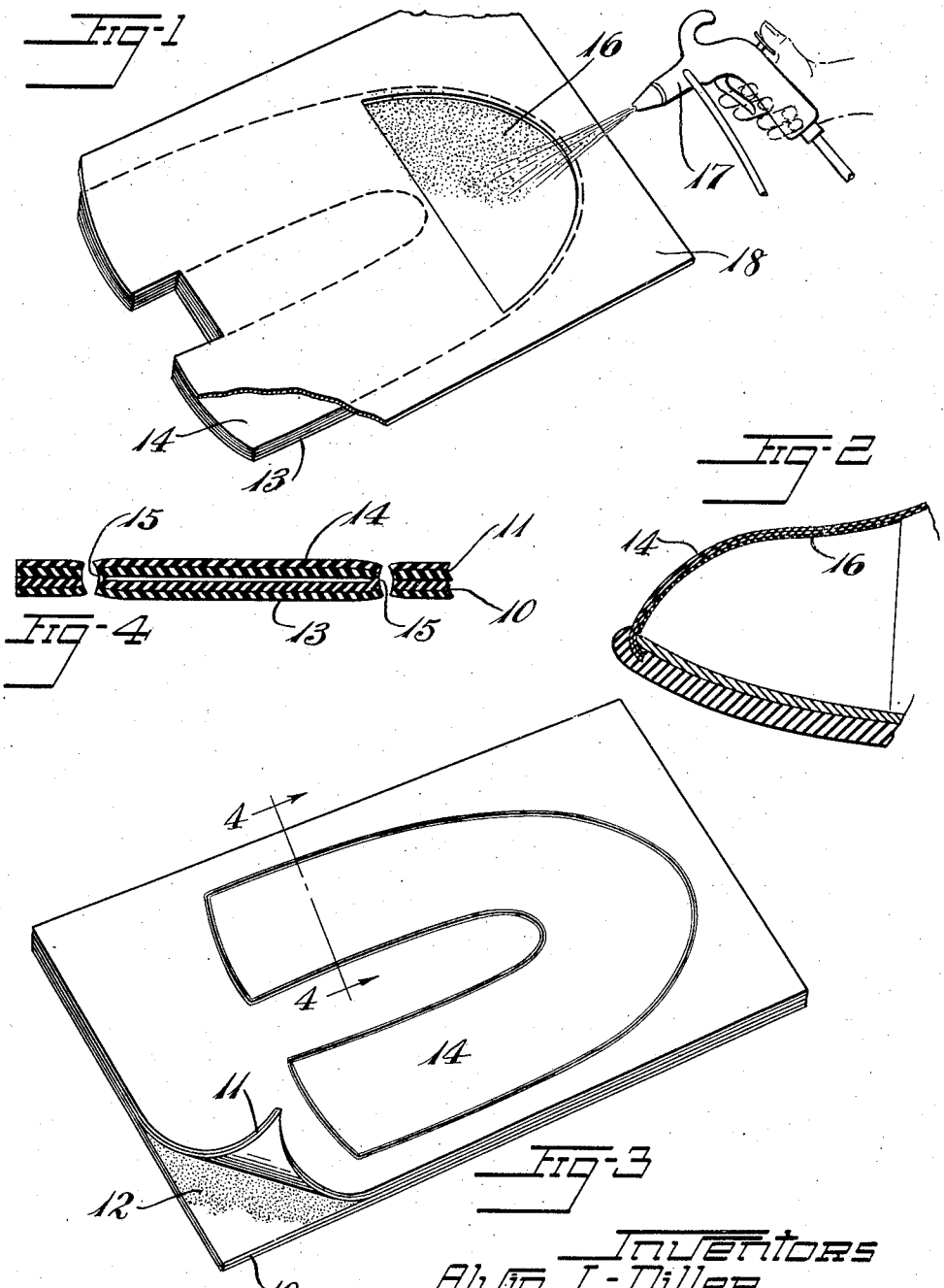

Patented Oct. 18, 1938

2,133,346

UNITED STATES PATENT OFFICE 2,133,346

METHOD OF APPLYING COATINGS TO PARTS OF RUBBER ARTICLES

Alvin L. Diller and Frederick F. Olson, Belmont, Mass., assignors to Hood Rubber Company, Inc., Watertown, Mass., a corporation of Delaware Application March 25, 1936, Serial No. 70,750

3 Claims. (Cl. 91—68)

This invention relates to methods of applying coatings to parts of rubber articles and is especially useful where coatings deposited from latex or aqueous dispersions of rubber are to be applied to the uppers of rubber shoes or similar parts of rubber articles.

It has been found that the uppers of rubber shoes, especially where such uppers do not contain reinforcing layers of textile material, have a tendency to sag from the lasts during the process of vulcanization. Such sagging of the uppers may be prevented by applying a layer of latex or other natural or artificial dispersion of rubber to the inner surface of the uppers at such places as sagging is liable to occur, as the coating deposited from a dispersion of rubber tends to shrink during vulcanization and counteracts the tendency of the calendered rubber to soften and stretch.

The principal objects of the present invention are to provide a method of applying such coatings with neatness, simplicity and efficiency while protecting the outer surfaces of the upper from being soiled.

Other objects will appear from the following description and the accompanying drawings.

Of the drawings:

Fig. 1 is a perspective view showing two vamps plied face to face and a coating being applied to a portion of the back of one vamp by spraying through a template, part of the template being broken away.

Fig. 2 is a longitudinal section through the toe of a shoe showing the coating on the inner face of the vamp.

Fig. 3 is a perspective view illustrating two sheets of vamp material laid face to face and cut seamed to provide a pair of vamps.

Fig. 4 is a section taken on line 4—4 of Fig. 3.

Fig. 5 is a sectional elevation of a dipping tank showing the step of coating a pair of doubled vamps.

Fig. 6 is a perspective view of the doubled vamps with the coating applied thereto and illustrating the separation of the vamps.

Fig. 7 is a sectional elevation of a dipping tank showing a complete upper being dipped while supported on a form.

Fig. 8 is a sectional view taken on line 8—8 of Fig. 7.

Referring to the drawings, in which the method is illustrated as used in the coating of sheet rubber parts of the rubber shoes, the method of the invention generally comprises laying sheets of the material face to face and cutting the parts in pairs therefrom and then coating exposed surfaces thereof while the parts protect the finished faces of each other from being soiled.

Referring first to Figs. 3 and 4, two layers of material 10, 11, suitable for forming a rubber shoe upper, and each of which consists of one or more plies of rubber material, are laid together face to face, and their faces are prevented from sticking together by a layer of dust 12, such as starch. By means of a suitable die, the sheets are cut simultaneously to form a pair of shoe parts 13, 14 and, at the same time, they are temporarily united along the line of cut, as at 15. This provides for the protection of the finished face of each part. A layer 16 of rubber may then be deposited on the exposed faces of the parts by means of a spray gun 17.

When it is desired to confine the sprayed deposit to a given area of the part, a template 18 may be used, as in Fig. 1, to additionally define the area of the deposit. In this manner the portion of a shoe upper most liable to sag from the last during vulcanization, as the portion adjacent the toe, may be coated on its inside surface. Such an upper, with the layer 16 of deposited rubber, is shown in Fig. 2 as built into a shoe.

The shoe parts may also be coated at the toe part by dipping, as illustrated in Figs. 5 and 6. In practicing the invention in this form, the sheet rubber parts, united around their edges and made as shown in Figs. 3 and 4, are dipped in a tank 19 containing a natural or artificial dispersion of rubber 20, and a coating 21 of rubber is deposited thereon. The surfaces of the sheet rubber parts in contact with each other are protected from the coating dispersion. After the coating 21 has dried, the parts 13, 14 may be separated from each other.

Where it is desired to coat an entire shoe upper over substantially its entire surface, the upper may be formed of a pair of blanks 22, 23, cut-seamed together about their margins. For convenience, a flat sheet metal form 24 fitted with a convenient handle 25 may be placed between the blanks either before they are seamed or afterwards by inserting the form between unseamed margins at one edge of the blanks, and used to support the blanks during the dipping operation.

We claim:

1. The method of preparing articles of unvulcanized sheet rubber which comprises laying two sheets of rubber material in face to face relation, cutting a pair of similar articles from the two sheets and simultaneously and temporarily seaming them to each other along the line of cut to prevent soiling of their contacting faces, applying a coating to at least a part of the exposed faces of the articles, and separating the articles from each other.

2. The method of preparing articles of unvulcanized sheet rubber which comprises laying two sheets of rubber material in face to face relation, cutting a pair of similar articles from the two sheets and simultaneously and temporarily seaming them to each other along the line of cut to prevent soiling of their contacting faces, dipping the attached sheets in a dispersion of rubber to apply a coating to at least a part of the exposed surface of the articles, and separating the articles from each other.

3. The method of preparing articles of unvulcanized sheet rubber which comprises laying two sheets of rubber material in face to face relation, cutting a pair of similar articles from the two sheets and simultaneously and temporarily seaming them to each other along the line of cut to prevent soiling of their contacting faces, spraying the attached sheets with a dispersion of rubber to apply a coating to at least a part of the exposed surface of the articles, and separating the articles from each other.

ALVIN L. DILLER.
FREDERICK F. OLSON.